(No Model.)

H. THÜMLER.
PHOTOGRAPHIC APPARATUS.

No. 458,699. Patented Sept. 1, 1891.

Witnesses:
H. B. Kingsbery
O. S. Morehus

Inventor:
Hugo Thümler,
by William E. Poulter,
attorney

UNITED STATES PATENT OFFICE.

HUGO THÜMLER, OF BERLIN, GERMANY.

PHOTOGRAPHIC APPARATUS.

SPECIFICATION forming part of Letters Patent No. 458,699, dated September 1, 1891.

Application filed October 15, 1890. Serial No. 368,240. (No model.) Patented in Germany May 13, 1890; in England June 23, 1890, No. 9,715; in Belgium July 1, 1890, No. 91,095, and in Switzerland August 4, 1890, No. 2,472.

*To all whom it may concern:*

Be it known that I, HUGO THÜMLER, a subject of the Emperor of Germany, residing at Berlin, Germany, have invented certain new and useful Improvements in Photographic Apparatus, (for which Letters Patent have been obtained in Great Britain, No. 9,715, dated June 23, 1890; in Germany, dated May 13, 1890; in Switzerland, No. 2,472, dated August 4, 1890, and in Belgium, No. 91,095, dated July 1, 1890,) of which the following is a specification.

The improvements in photographic apparatus forming the subject of this invention consist of a folding pocket-camera, the bellows of which is made of paper impervious to light and folded after the fashion of the well-known Japanese paper lanterns.

Figure 1:
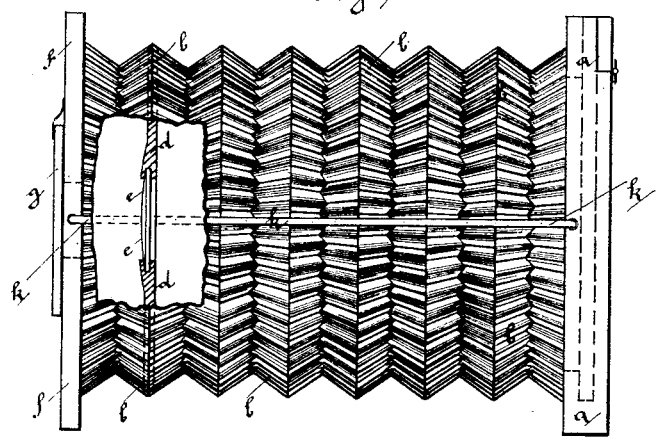
Figure 2:
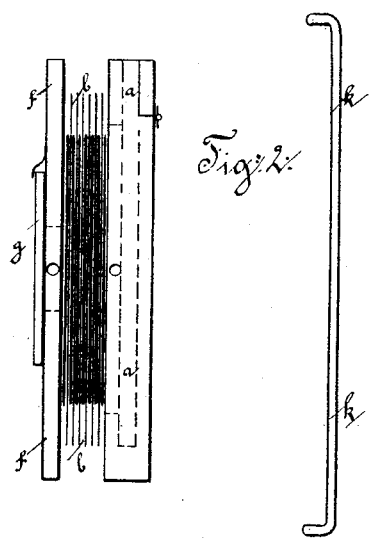

In the accompanying drawings, Figure 1 is a side elevation of the improved camera in its extended condition, and Fig. 2 is a similar view of the same in its folded up or closed form.

$a$ is a frame or case adapted to receive a dry-plate, which may be inserted into it either through the top or through one of the sides. The front opening of the case or frame $a$ is covered over by the bellows $b$, attached to it, so as to effectively shut out the light. This bellows $b$ is made of dark-colored paper impervious to light and may be of circular or square section. Its main folds are circumferential or perpendicular to the focal axis of the camera, while to impart increased rigidity to it it is also provided with folds or creases parallel with the focal axis or at right angles to the main folds, as will be readily understood by referring to Fig. 1. Within the bellows $b$ is arranged a disk or diaphragm $d$, in the central opening of which is fitted a lens $e$. To the end of the bellows is attached a plate $f$, also impervious to light, but provided with an opening for the admission of light when required, which opening is normally closed by a blind or shutter $g$.

When folded, as shown in Fig. 2, the camera is retained in its compact condition by means of straps, bands, or the like, and may conveniently be carried in the pocket.

When it is desired to take a photograph, the bellows $b$ is first stretched out to its full extent, and to counteract its tendency to return to its closed position, owing to the natural elasticity of the folded paper, as also to secure the lens $e$ at the required distance from the dry-plate contained in the frame $a$, special stays or stiffeners $k$ are applied thereto. The stiffeners or stays may either be permanently attached or pivoted to one side of the frame $a$ or carried loose and bent at one or both ends, so as, when required, to enter holes or eyes provided for the purpose in or on the frame $a$ and plate $f$, or it may simply bear against the latter. The bellows is thereby stiffened and at the same time the desired length of extension is insured. When loose, the stays must be put away separately.

I claim—

In a photographic pocket-camera, the combination, with a bellows provided with main folds perpendicular to and smaller folds parallel with the focal axis of the camera, of a frame, a plate or diaphragm, a lens, a perforated front-plate shutter, and a stay or stiffener, substantially as described.

In testimony whereof I have hereto set my hand in the presence of two subscribing witnesses.

HUGO THÜMLER.

Witnesses:
 RÜD. SCHMIDT,
 ERNST LEHMANN.